United States Patent
Ryu et al.

(10) Patent No.: US 7,831,242 B2
(45) Date of Patent: Nov. 9, 2010

(54) VOICE NOTIFYING SERVICE SYSTEM AND SERVICE PROVIDING METHOD FOR MOBILE TERMINAL

(75) Inventors: Sung Hak Ryu, Gumi-si (KR); Suk Woo Chae, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 861 days.

(21) Appl. No.: 11/713,697

(22) Filed: Mar. 5, 2007

(65) Prior Publication Data

US 2008/0064372 A1    Mar. 13, 2008

(30) Foreign Application Priority Data

Sep. 7, 2006    (KR) .................. 10-2006-0085951

(51) Int. Cl.
*H04M 1/725* (2006.01)
(52) U.S. Cl. .............. 455/412.2; 455/404.1; 455/414.1; 455/567; 379/252
(58) Field of Classification Search ............... 455/403, 455/404.1, 412.2, 413, 414.1, 415, 445, 459, 455/461, 466, 418, 414.2, 343.4, 567, 556; 379/110.01, 207.03, 433.1, 252, 88.04, 88.21–88.27
See application file for complete search history.

(56) References Cited

U.S. PATENT DOCUMENTS

| | | | | |
|---|---|---|---|---|
| 5,764,747 A | * | 6/1998 | Yue et al. | 379/211.03 |
| 6,327,483 B1 | * | 12/2001 | Taniguchi | 455/569.1 |
| 7,251,506 B2 | * | 7/2007 | Yasutake | 455/567 |
| 2001/0039561 A1 | * | 11/2001 | Cho | 709/200 |
| 2002/0120457 A1 | * | 8/2002 | Oliveira et al. | 704/500 |
| 2003/0125954 A1 | * | 7/2003 | Bradley et al. | 704/270 |
| 2005/0181772 A1 | * | 8/2005 | Crowell | 455/414.1 |

FOREIGN PATENT DOCUMENTS

| | | | |
|---|---|---|---|
| CN | 1791146 A | | 6/2006 |
| JP | 362007250 | * | 7/1985 |
| JP | 408149206 | * | 11/1994 |
| JP | 411215554 | * | 8/1999 |
| KR | 10-1998-0016076 A | | 5/1998 |
| KR | 100182085 B1 | | 12/1998 |
| KR | 10-2002-0008970 A | | 2/2002 |
| KR | 10-2005-0089254 A | | 9/2005 |
| KR | 10-2006-0024700 A | | 3/2006 |
| WO | WO 2005/086507 A1 | | 9/2005 |

* cited by examiner

*Primary Examiner*—Kamran Afshar
*Assistant Examiner*—Marisol Fahnert
(74) *Attorney, Agent, or Firm*—Roylance, Abrams, Berdo & Goodman, LLP (57) ABSTRACT

A voice notifying service system and a service providing method are provided for a mobile terminal, wherein the voice notifying service system includes a mobile communication system and a mobile terminal for forming a communication channel with the mobile communication system, transmitting voice information, the voice information including a voice and a notifying function for playing the voice, to the mobile communication system, transmitting time information to the mobile communication system specifying the time at which the voice information is to be transmitted to the mobile terminal, and playing the voice information when received from the mobile communication system at the time specified in the time information.

20 Claims, 10 Drawing Sheets

VOICE NOTIFYING SERVICE SYSTEM AND SERVICE PROVIDING METHOD FOR MOBILE TERMINAL

CROSS-REFERENCE TO RELATED APPLICATION

This application claims the benefit under 35 U.S.C. §119 (a) of Korean Patent Application No. 10-2006-0085951, filed Sep. 7, 2006, in the Korean Intellectual Property Office, the entire disclosure of which is hereby incorporated by reference.

BACKGROUND OF THE INVENTION

1. Field of the Invention

The present invention relates to a voice notifying service system and a service providing method for a mobile terminal. In particular, the present invention relates to a voice notifying service system and a service providing method for a mobile terminal thereby enabling transmission and reception of voice information desired, respectively, by a caller and a receiver, in a predetermined voice and/or at a predetermined time.

2. Description of the Prior Art

Mobile terminals have become commonly used in various fields due to their portability, variety of application programs, and ease of use. Among such mobile terminals, many mobile communication terminals have a function for voice communication while moving, and accordingly, the numbers of mobile communication terminal users (telephone subscribers) are rapidly increasing.

These mobile communication terminals have developed to also provide various optional functions for the terminal users. Particularly, an alarm function and a morning call function substituting for the function of an alarm clock, are basic functions that are now often provided to the mobile communication terminal users. Additionally, schedule functions of recently developed mobile communication terminals can be provided to store daily schedules input by the users and notify the terminal user at a specific time, and thereby satisfy a number of user requirements.

However, the alarm and morning call functions are limited to notifying a user using only a melody pre-stored in the mobile terminal. The conventional mobile terminal notifies the terminal user by activating such a pre-stored melody at a specific time predetermined by the terminal user, and therefore the terminal user must listen to the same melody repeatedly. For this reason, the terminal user may become less interested in the alarm and morning call functions, and the basic object of the alarm and morning call functions may gradually become less successful over time because of the repeated use of the same melody.

In the schedule function, the conventional mobile terminal stores and emits an alarm for a schedule in a text form, and the terminal user may experience difficulty in character input for schedule preparation and inconvenience in searching a schedule and identifying text. The difficulty and inconvenience may substantially reduce the user's interest in the schedule function, and thereby the terminal user may use fewer schedules including a simple text.

Accordingly, a new system and method is required for improving the usability of various optional functions provided by the mobile terminals, such as an alarm function, morning call function, schedule function, and the like.

SUMMARY OF THE INVENTION

Embodiments of the present invention have been made to substantially solve the above and other problems, and an object of embodiments of the present invention is to provide a voice notifying service system and a service providing method for a mobile terminal thereby enabling the acquirement and use of information in a voice desired by a terminal user when using an alarm or similar function.

Another object of embodiments of the present invention is to provide a voice notifying service system and a service providing method for a mobile terminal thereby enabling the transmission of voice information stored in a mobile terminal to another mobile terminal in a voice, and/or at a time, desired by a sender.

In order to achieve the above and other objects, a voice notifying service system according to an exemplary embodiment of the present invention is provided and comprises a mobile communication system and a mobile terminal for forming a communication channel with the mobile communication system, transmitting voice information, the voice information comprising a user's voice or a received voice and a notifying function for playing the voice, to the mobile communication system, transmitting time information to the mobile communication system specifying the time at which the voice information is to be transmitted to the mobile terminal, and playing the voice information received from the mobile communication system at the time specified in the time information.

A voice notifying service providing method for a mobile terminal according to an exemplary embodiment of the present invention is provided and comprises the steps of generating voice information, the voice information comprising a user's voice or a received voice and a notifying function for playing the voice, setting time information for receiving the voice information, transmitting the voice information and the time information to a mobile communication system, identifying whether the voice information is received by the mobile terminal at the time specified in the time information and playing, if the voice information is received, the voice by linking the notifying function included in the voice information with the voice.

A voice notifying service system for a mobile terminal according to another exemplary embodiment of the present invention is provided and comprises a caller's mobile terminal for transmitting voice information, time information set for transmitting the voice information, and a telephone number of a mobile terminal by which the voice information is to be received, wherein the voice information is generated by linking a user's voice or a received voice with a notifying function provided by the caller's mobile terminal, a receiver's mobile terminal for receiving from the caller's mobile terminal the voice information at the time specified in the time information and playing the voice information, and a mobile communication system for receiving from the caller's mobile terminal the voice information, the time information, and the telephone number, and for transmitting the voice information to the receiver's mobile terminal at the time specified in the time information.

A voice notifying service providing method for a mobile terminal according to another exemplary embodiment of the present invention is provided and comprises the steps of generating voice information by a caller's mobile terminal, by linking a user's voice or a received voice with a notifying function provided by the caller's mobile terminal, setting time information for the time at which a receiver's mobile terminal is to receive the voice information, and setting a telephone number of the receiver's mobile terminal by the caller's mobile terminal, transmitting the voice information, the time information, and the telephone number of the receiver's mobile terminal to a mobile communication system by the caller's mobile terminal, identifying whether the voice information is received from the mobile communication system by the receiver's mobile terminal and playing, if the voice information is received, the voice by linking a notifying function with the voice by the receiver's mobile terminal.

BRIEF DESCRIPTION OF THE DRAWINGS

The above and other objects, features and advantages of embodiments of the present invention will become more apparent from the following detailed description in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention are described in detail with reference to the accompanying drawings. Detailed descriptions of constructions or processes well known to those skilled in the art are omitted to avoid obscuring the subject matter of the invention in unnecessary detail. Particular terms are defined to describe embodiments of the present invention in the best manner.

Accordingly, the exemplary meanings of specific terms or words used herein should not be limited to the literal or commonly employed sense, but should be construed in accordance with the spirit of embodiments of the present invention. The description of the various embodiments is to be construed as exemplary only and does not describe every possible instance of the invention. Therefore, it should be understood that various changes can be made and equivalents can be substituted for elements thereof.

For example, an exemplary embodiment of the present invention is disclosed for a notifying function provided by a mobile terminal, such as an alarm function, morning call function, schedule function, and the like. However, a notifying function service system and a service providing method according to embodiments of the present invention are not limited thereto. The voice notifying service system and service providing method can utilize an event notifying function, significant date notifying function, due date notifying function, and other functions, in addition to an alarm function, morning call function, and schedule function. The system and method can be comprehensively applied to any number of extended or modified forms of the above or other functions.

For convenience in the following explanation and easier understanding of the scope of embodiments of the present invention, the mobile terminal is described in two terms, a "receiver's mobile terminal" (or receiving mobile terminal) and a "caller's mobile terminal" (or calling mobile terminal). However, a single mobile terminal can operate as both a receiver's mobile terminal and a caller's mobile terminal, whereby the mobile terminal can transmit or receive voice information at a predetermined time.

In embodiments of the present invention, a voice service server for the mobile communication system can transmit a call for a voice notifying function to a receiver's mobile terminal by forming the call similar to a morning call. However, the voice service server preferably provides a voice notifying service by forming a call in a prefix system, which adds specific numbers in the front of a receiver's telephone number.

Although a mobile communication terminal is described as an example of the mobile terminal in exemplary embodiments of the present invention, embodiments of the present invention are not limited thereto. The mobile terminal is a terminal that can transmit or receive voice information at a predetermined time, and is preferably applied to all information and communication equipment, multimedia equipment, and their applications, such as a mobile communication terminal, digital broadcasting terminal, PDA (personal digital assistant), smart phone, IMT-2000 (International Mobile Telecommunication 2000) terminal, WCDMA (Wideband Code Division Multiple Access) terminal, and UMTS (Universal Mobile Telecommunication Service) terminal.

Figure 1:
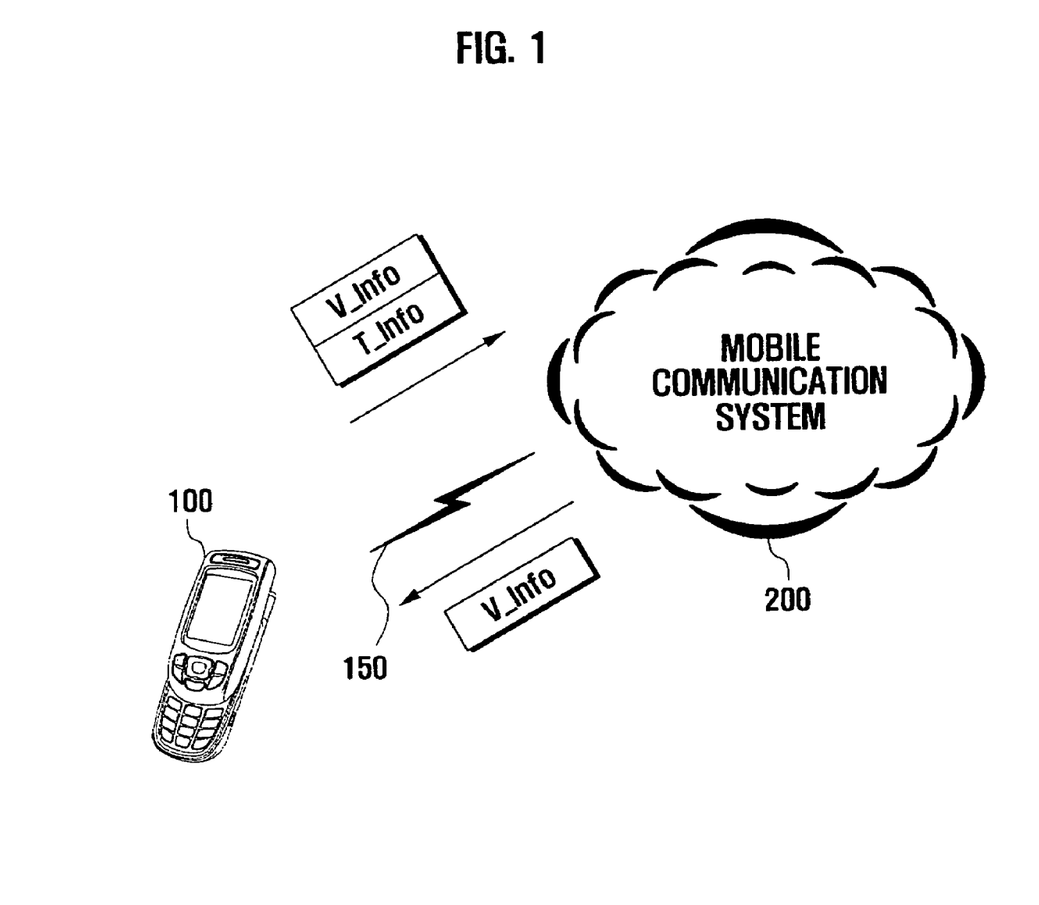
FIG. 1 is a schematic diagram showing a configuration of a voice notifying service system for a mobile terminal according to an exemplary embodiment of the present invention.

FIG. 1 is a schematic diagram showing a configuration of a voice notifying service system for a mobile terminal according to an exemplary embodiment of the present invention.

Referring to FIG. 1, the voice notifying service system comprises a mobile terminal 100 and a mobile communication system (MCS) 200. The mobile terminal 100 forms a communication channel 150 with the mobile communication system 200, transmits voice information V_Info and time information T_Info to the mobile communication system 200 through the communication channel 150, and activates the voice information V_Info received from the mobile communication system 200 at the time specified in the time information T_Info.

The voice notifying service system stores, in the mobile communication system 200, the time information T_Info specified by the mobile terminal 100 and the voice information V_Info to be transmitted to the mobile terminal 100 at the specified time, and transmits the voice information V_Info at the time designated by the time information T_Info to the mobile terminal 100. For this, the mobile communication system 200 can have a configuration shown by way of example in FIG. 2.

Figure 2:
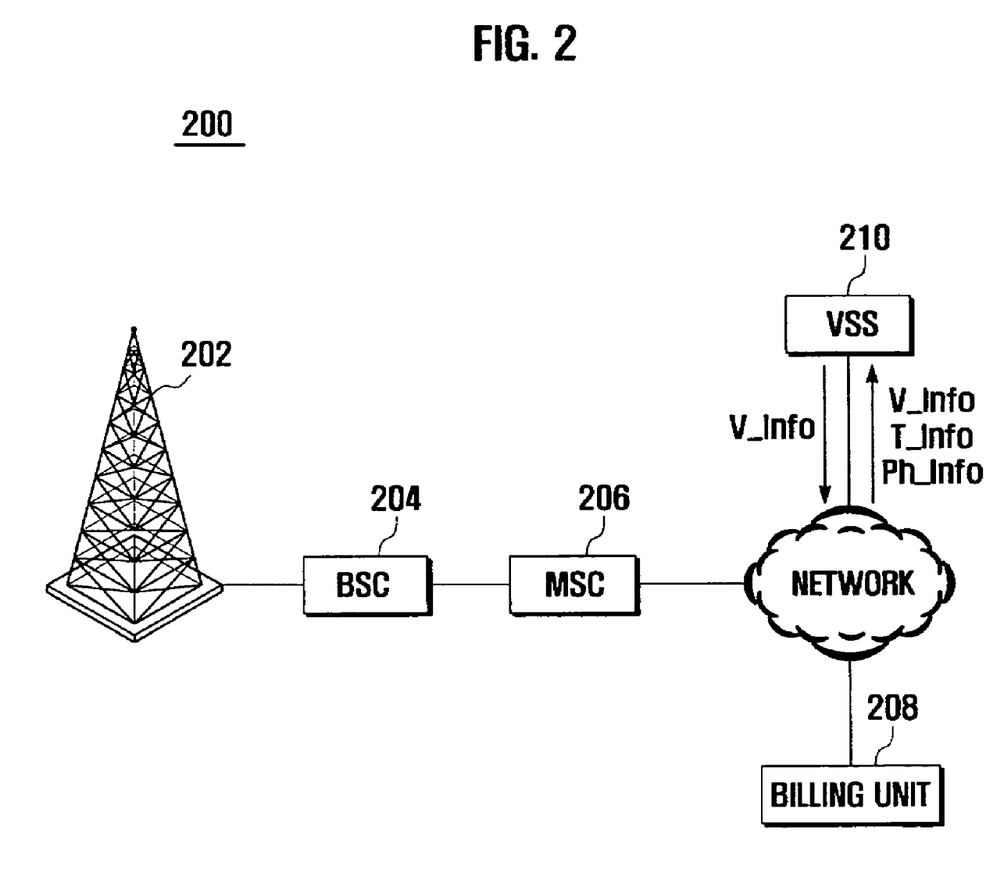
FIG. 2 is a schematic diagram showing a configuration of a mobile communication system according to an exemplary embodiment of the present invention.

FIG. 2 is a schematic diagram showing a configuration of the mobile communication system 200 according to an exemplary embodiment of the present invention.

Referring to FIGS. 1 and 2, the mobile communication system 200 receives time information T_Info and voice information V_Info from the mobile terminal 100, and transmits the voice information V_Info to the mobile terminal 100 at the time specified in the time information T_Info.

For this, the mobile communication system 200 preferably comprises a base station (BS) 202, base station controller (BSC) 204, mobile switching center (MSC) 206, billing unit 208, and voice service server (VSS) 210. In the mobile communication system 200, the voice service server 210 is configured to be connected to the mobile switching center 206 through a network. However, the voice service server 210 can be disposed in the base station controller 204 without connection to a mobile switching center 206.

The base station 202 processes voice information and other data by forming a communication channel 150 with the mobile terminal 100. The base station 202 performs baseband signal processing, conversion between wired and wireless, and transmission and reception of radio frequency (RF) signals, and operates as a network terminal to which the mobile terminal 100 is directly connected.

The base station controller 204 is located between the base station 202 and the mobile switching center 206, and controls the base station 202. The base station controller 204 has functions for allocating and de-allocating a wireless channel for the mobile terminal 100, controlling transmission outputs between the mobile terminal 100 and the base station 202, operating and maintaining the base station 202, and determining and performing a handoff between cells formed by the base station 202. Additionally, in the case where the voice service server 210 is included in the base station controller 204, the base station controller 204 can perform a function for storing voice information V_Info, time information T_Info, and telephone number information Ph_Info received from the mobile terminal 100, in the voice service server 210.

The mobile switching center 206 is a device for forming a mobile communication service network by connecting with the base station controller 204, and includes a wired/wireless complex digital mobile switching center for providing a wired communication function and mobile communication function. The mobile switching center 206 performs functions for processing basic and additional services, receiving and sending calls of telephone subscribers, storing location and handoff, and synchronizing an existing network with another network. Particularly, in the case where the voice service server 210 is separately operated and connected to the mobile switching center 206 through a network, the mobile switching center 206 can transmit the voice information V_Info received from the mobile terminal 100 to the voice service server 210.

The billing unit 208 performs billing for voice information V_Info used by the mobile terminal 100. The billing unit 208 can bill based on information corresponding to the data amount of voice information V_Info used by the mobile terminal 100, or corresponding to the type and number of serviced voice information V_Info. However, embodiments of the present invention are not limited thereto. The billing unit 208 can be configured to bill based on other information or can be omitted according to the type of service.

The voice service server 210 can be disposed in the base station controller 204, or can be disposed separately as described in greater detail below. That is, embodiments of the present invention are not limited to the voice service server 210 being disposed at the location of the base station controller 204, and the voice service server 210 can be separately operated by connecting the voice service server 210 to the mobile switching center 206 through a network.

Figure 3:
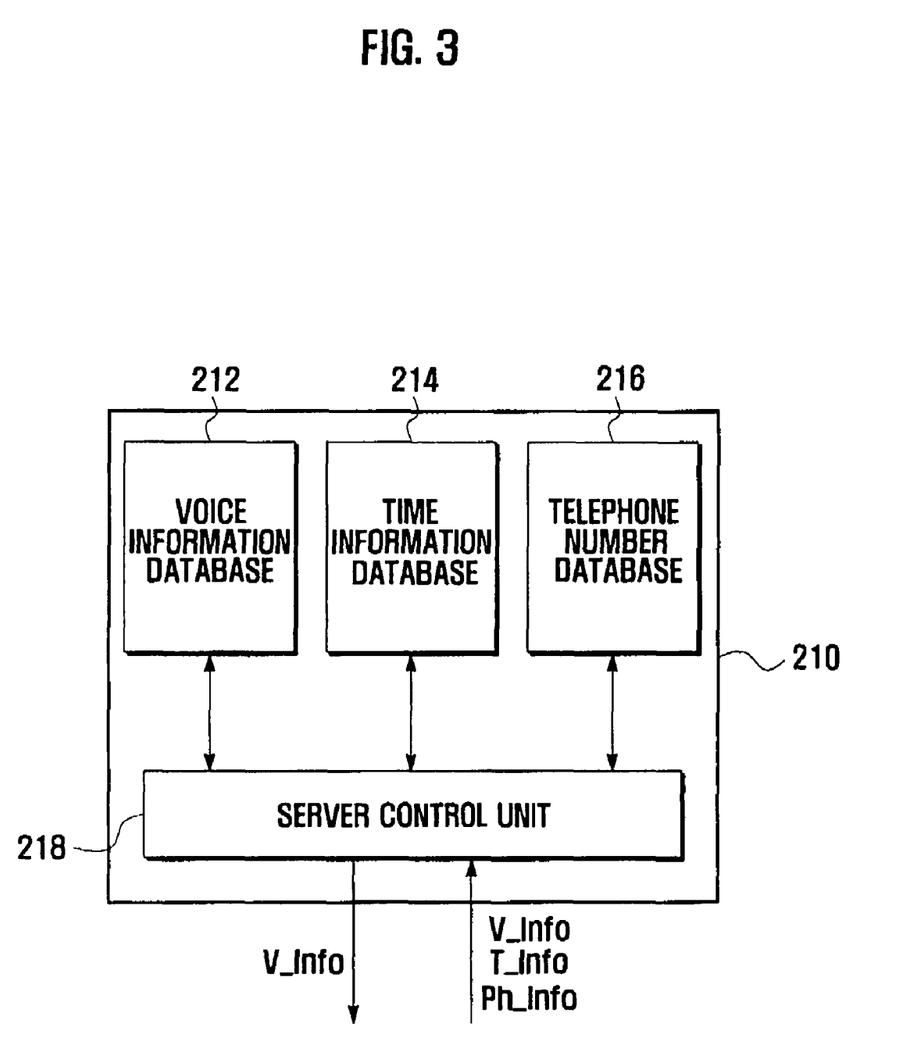
FIG. 3 is a block diagram showing a configuration of a voice service server included in the mobile communication system of FIG. 2.

FIG. 3 is a block diagram showing a configuration of a voice service server included in the mobile communication system of FIG. 2. Referring to FIG. 3, the voice service server 210 comprises a voice information database 212 for storing at least one voice information V_Info received from the mobile terminal 100, a time information database 214 for storing time information T_Info specifying the time for transmitting the voice information V_Info to the mobile terminal 100, a telephone number database 216 for storing a telephone number of the mobile terminal 100, and a server control unit 218 for controlling the voice information database 212, the time information database 214, and the telephone number database 216, and for controlling the transmission of the voice information V_Info to the mobile terminal 100 having the telephone number at the time specified in the time information T_Info.

The voice information database 212 stores voice information V_Info received from the mobile terminal 100. The voice information V_Info can comprise a voice to be transmitted to a terminal user when an alarm function is activated, a voice to be transmitted to a terminal user when a morning call function is activated, a voice for a schedule function, a voice for an event notifying function, a voice for a significant date notifying function, a voice for a due date notifying function, and so forth. The voice information database 212 further includes setting information for a voice and a function for playing the voice. Additionally, the voice information database 212 stores various functions designated by the mobile terminal user and voice information V_Info corresponding to the functions in addition to the above voices individually having a specific function.

A voice included in the voice information V_Info can be recorded directly by the terminal user or another caller's voice can be recorded. The voice can be partially or fully stored during a voice conversation with another terminal user according to the decision of the terminal user, and can be used as voice information V_Info.

The time information database 214 stores the time for transmitting voice information V_Info stored in the voice information database 212, and outputs the time stored in the time information T_Info to the server control unit 218 such that the corresponding voice information V_Info can be transmitted at the specified time. The time information T_Info can be set such that the voice information V_Info is transmitted at a specific date and/or time. However, in other embodiments of the present invention, the transmission of the voice information V_Info can be repeated every day, on a specific day of the week, and/or on a specific date, by setting a repetition period for an alarm function or morning call function.

In the case where a plurality of terminal users subscribe to a voice notifying service for a mobile terminal according to embodiments of the present invention, the telephone number database 216 is used as an index of mobile terminals 100 for correctly transmitting voice information V_Info at the time specified in the time information T_Info.

The server control unit 218 stores voice information V_Info and time information T_Info received from the mobile terminal 100, respectively, in the voice information database 212 and time information database 214. The server control unit 218 extracts the telephone number of the mobile terminal 100 and stores the telephone number, by matching the number with the voice information V_Info and time information T_Info, in the telephone number database 216. In the case where the mobile terminal 100 stores voice information V_Info having a plurality of functions, the telephone number of the mobile terminal 100 is stored, by matching the plurality of functions with the voice information V_Info in the voice information database 212 and matching the number with the voice information V_Info and time information T_Info, in the telephone number database 216. By detecting the time information T_Info stored in the time information database 214, the voice information V_Info is controlled to be transmitted to the mobile terminal 100 having the corresponding telephone number at the time specified in the time information T_Info.

A configuration of a mobile terminal storing voice information V_Info and receiving a corresponding service is described in greater detail below.

Figure 4:
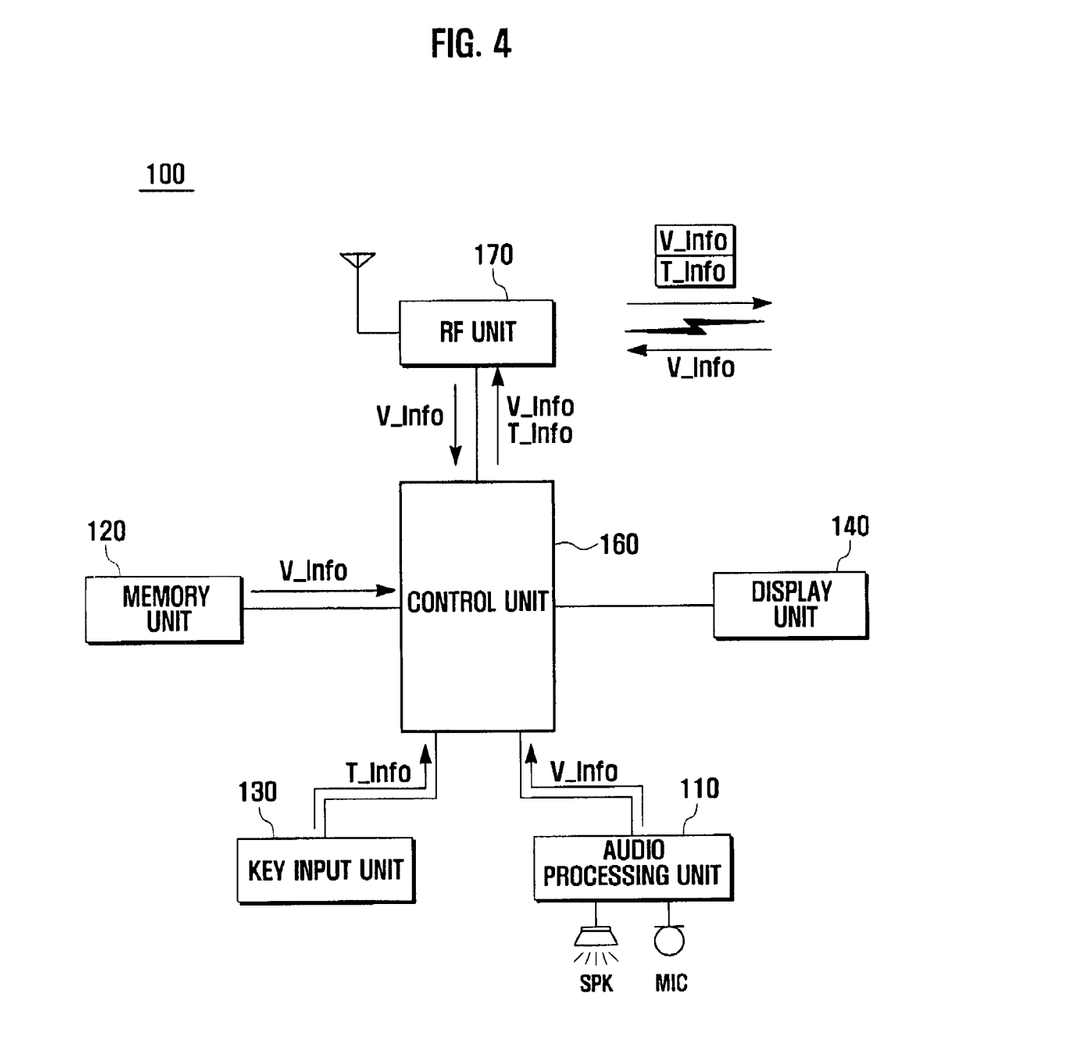
FIG. 4 is a block diagram showing a configuration of a mobile terminal according to an exemplary embodiment of the present invention.

FIG. 4 is a block diagram showing a configuration of the mobile terminal 100 according to an exemplary embodiment of the present invention.

Referring to FIG. 4, the mobile terminal 100 comprises an audio processing unit 110, a memory unit 120, a key input unit 130, a display unit 140, a control unit 160, and an RF unit 170.

The audio processing unit 110 generates a voice to be included in the voice information V_Info of the mobile terminal 100. A terminal user generates a voice to be activated at the time corresponding to the above functions by using a recording function of the mobile terminal 100, and the voice is transmitted to the memory unit 120. For this, the audio processing unit 110 includes a microphone MIC for inputting a voice, and a speaker SPK for outputting the input voice at the time of activation.

The memory unit 120 stores application programs for activation of functions (such as an alarm function, morning call function, and schedule function), a voice generated by the terminal user through the audio processing unit 110 or a voice received from an outside source, and information of a corresponding function for the voice. That is, the memory unit 120 stores voice information V_Info including a voice and a function to be used for the voice. The voice information V_Info can comprise a voice input directly by a terminal user, a voice of another terminal user collected during a voice communication, and other voices.

The memory unit 120 comprises a program area and a data area. The program area stores an operation system for the mobile terminal 100, and application programs for an alarm function, morning call function, schedule function, and other optional functions, such as a camera function, sound play function, and image or moving picture play functions for the mobile terminal 100. When individual functions are activated according to a request from the terminal user, the memory unit 120 provides corresponding application programs under the control of the control unit 160.

The data area stores voice information V_Info generated corresponding to a function used by the mobile terminal 100 and voice information V_Info to be activated corresponding to a function selected from the above mentioned functions. The data area can also store user data related to other various optional functions.

The key input unit 130 receives user input of alphanumeric characters, and comprises a plurality of input keys and function keys for setting various functions. The function keys can include direction keys, side keys, and shortcut keys allocated for performing specific functions. Additionally, the key input unit 130 transmits signals related to user setting and function control of the mobile terminal 100 to the control unit 160. Particularly, the key input unit 130 generates a key input signal for setting a function to be applied to the voice. That is, in order to match voices stored in the memory unit 120 with individual functions to be applied, such as an alarm function, morning call function, and schedule function, the key input unit 130 generates voice information V_Info by generating a key input signal for searching and selecting a function to be applied. Additionally, the key input unit 130 generates time information T_Info and transmits the time information T_Info and the voice information V_Info to the mobile communication system 200. In greater detail, the mobile terminal 100 that generates the voice information V_Info, sets the time for the voice information V_Info to be received by using the key input unit 130. If the time setting is completed, the voice information V_Info and the time information T_Info are transmitted to the mobile communication system 200 through a communication channel, and stored in the voice service server 210.

The display unit 140 displays various menus of the mobile terminal 100, time information input by the user, and information to be provided to the user. Particularly, the display unit 140 provides screens activated by various functions such as an alarm function, morning call function, and schedule function, and provides screens for inputting an index of voices to be stored in the individual functions, such as a voice file name and time information T_Info matched to the voice information V_Info.

Figure 5:
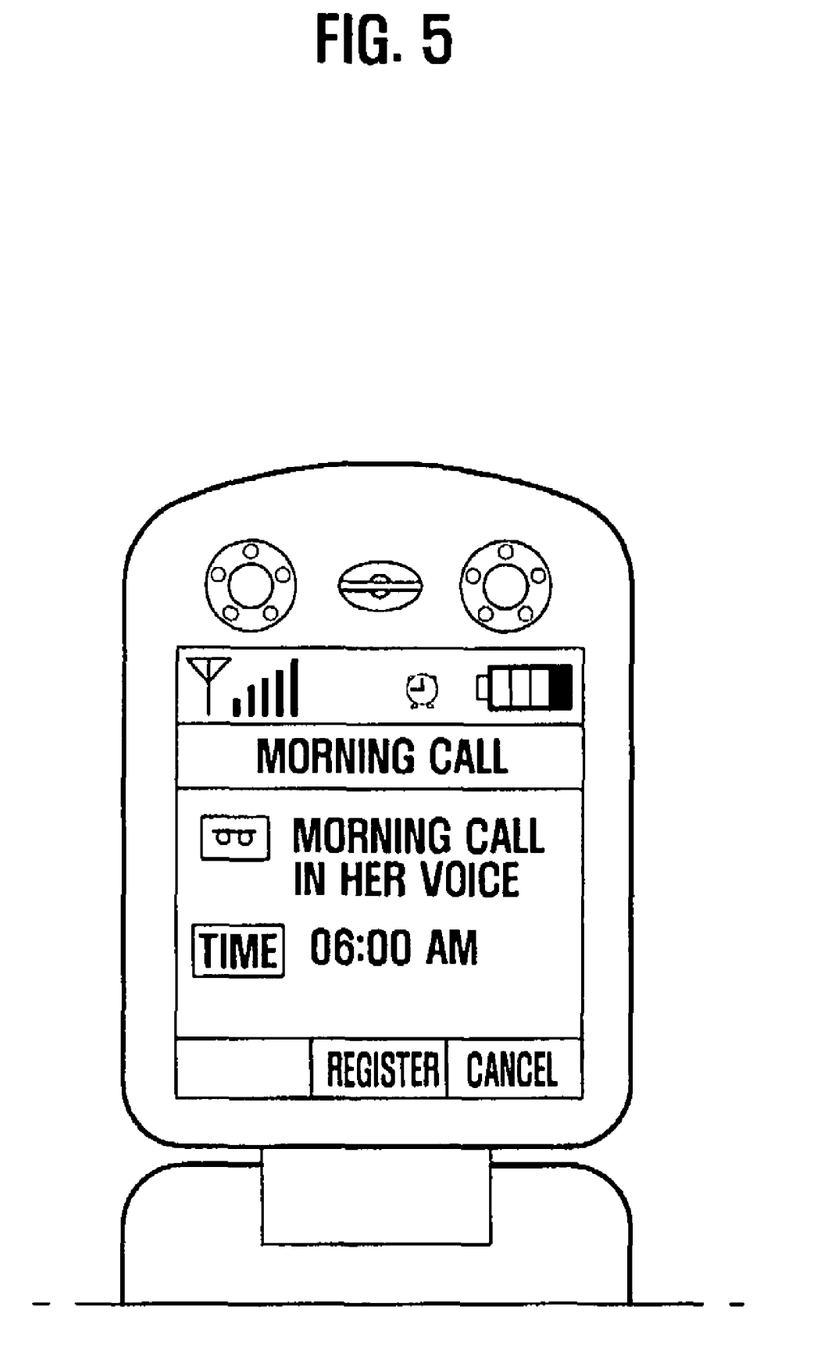
FIG. 5 is a view showing a voice notifying service setting screen displayed on a mobile terminal according to an exemplary embodiment of the present invention.

As shown in FIG. 5, which is a view of a voice notifying service screen displayed on a mobile terminal according to an exemplary embodiment of the present invention, the display unit 140 can display a name of function such as a morning call, a generated voice file name, and time information T_Info for receiving the voice information V_Info in a function setting screen. Keys, such as 'Register' and 'Cancel' keys, are displayed at the bottom of the screen for the selection of voice information V_Info and time information T_Info to be stored.

If the 'Register' key is clicked, the RF unit 170 forms a communication channel 150 with the mobile communication system 200 according to the control of the control unit 160, and the voice information V_Info and time information T_Info are stored in the voice service server 210 of the mobile communication system 200 through the communication channel 150. The display unit 140 can be formed with a liquid crystal display (hereinafter LCD). In the case where the LCD has a touch screen function, the display unit 140 can further operate as an input means.

The RF unit 170 forms the communication channel 150 with the base station 202 of the mobile communication system 200, and transmits and receives voice information V_Info and time information T_Info through the communication channel 150. For this, the RF unit 170 can comprise an RF transmitter for upconverting the frequency of a signal to be transmitted and amplifying the signal, and an RF receiver for low-noise amplifying a received signal and downconverting the frequency of the signal.

The control unit 160 controls general operations of the mobile terminal 100 and signal flows between internal units of the mobile terminal 100. The control unit 160 can comprise a modem function, a codec function, and the like. Particularly, the control unit 160 controls functions of a voice notifying service according to an exemplary embodiment of the present invention.

In greater detail, the control unit 160 controls the audio processing unit 110 for generating a voice and the setting of a function to be applied to the voice. The control unit 160 also controls the memory unit 120 for storing voice information V_Info generated by setting the voice and function, and controls the key input unit 130 for generating time information T_Info corresponding to the voice information V_Info. The control unit 160 also controls the transmitting and receiving of a signal for forming a communication channel 150 between the RF unit 170 and the mobile communication system 200, and the transmitting of the voice information V_Info and the time information T_Info.

Although a block configuration of the mobile terminal 100 has been illustrated in FIG. 4 for illustration, embodiments of the present invention are not limited to such a configuration. The mobile terminal 100 according to exemplary embodiments of the present invention can further include other units, for example, a camera unit and/or a digital-broadcast receiving module, according to the type of service.

Figure 6:
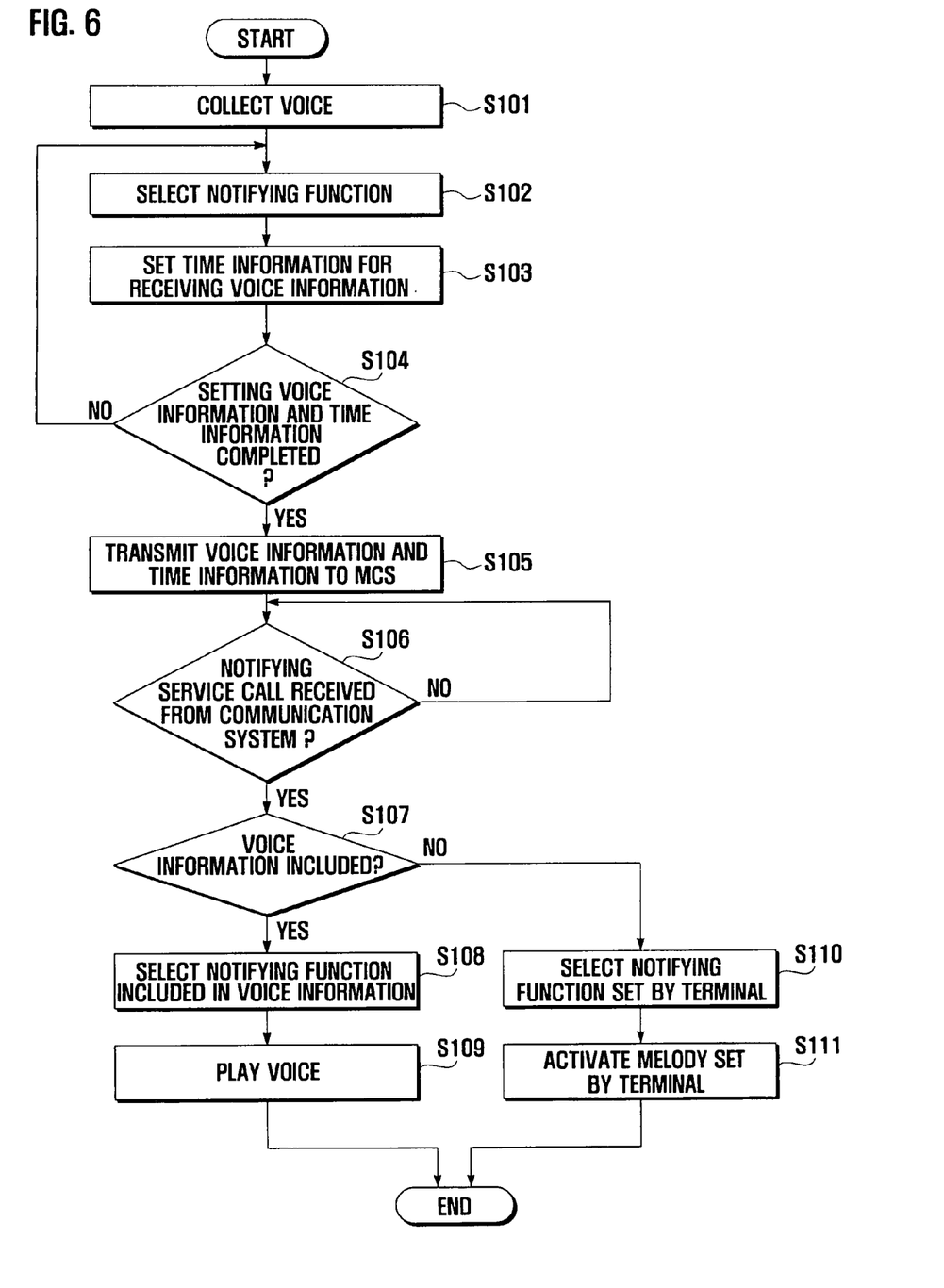
FIG. 6 is a flow chart showing a voice notifying service providing method for a mobile terminal according to an exemplary embodiment of the present invention.

FIG. 6 is a flow chart showing a voice notifying service providing method for a mobile terminal according to an exemplary embodiment of the present invention.

Referring to FIG. 6, the mobile terminal 100 first collects a voice to be included in voice information V_Info at step (S101).

The voice included in the voice information V_Info can be recorded directly by the terminal user or another caller's voice can be recorded. That is, the voice can be partially or fully stored according to the selection of the user during a voice communication with another terminal user for later use.

The mobile terminal 100 then selects a notifying function to be linked with the recorded voice at step (S102).

The notifying function can include an alarm function, morning call function, schedule function, event notifying function, significant date notifying function, and due date notifying function, and voice information V_Info is generated by linking the selected function with the voice.

Subsequently, time information T_Info is generated by setting a time for receiving the voice information V_Info from the mobile communication system (MCS) 200 at step (S103).

The mobile terminal 100 generates the time information T_Info including the time for receiving the voice information V_Info. For this, the mobile terminal 100 can provide a screen interface for setting the time information T_Info and the voice information V_Info on the display unit 140. The time information T_Info can be set such that the voice information V_Info is transmitted from the MCS 200 to the mobile terminal 100 at a specific date and/or time. However, in yet other embodiments of the present invention, the transmission of the voice information V_Info can be repeated every day, on a specific day of the week, and/or on a specific date by setting a repetition period for an alarm function or morning call function. When the setting of the voice information V_Info and time information T_Info is completed as detected at step (S104), the voice information V_Info and the time information T_Info of the mobile terminal 100 are transmitted to the voice service server 210 of the mobile communication system (MCS) 200 at step (S105). When the setting of the voice information V_Info and time information T_Info is not completed, the method returns to step (S102).

In step (S105), the mobile terminal 100 forms a communication channel 150 with the mobile communication system 200, and transmits the voice information V_Info and the time information T_Info through the communication channel 150 to the mobile communication system 200. The base station controller 204 detects the telephone number of the mobile terminal 100 and transmits the telephone number to the voice service server 210, so that the voice information V_Info can be transmitted to the mobile terminal 100 at the specified time. The voice service server 210 stores the voice information V_Info, the time information T_Info, and the telephone number in the voice information database 212, the time information database 214, and the telephone number database 216, respectively.

The voice service server 210 then determines whether the current time has reached the time specified in the time information T_Info. The voice service server 210 can store the time information T_Info in the time information database 214 in the order of transmission time, instead of registration time, but is not limited thereto. At the time specified in the time information T_Info, a call is transmitted from the mobile communication system 200.

Subsequently, the mobile terminal 100 identifies whether a call related to a notifying service is received from the mobile communication system 200 at a notifying service time set by the terminal user at step (S106). If a call related to a notifying service is received, the mobile terminal 100 identifies whether voice information V_Info is included in the call received from the mobile communication system 200 at step (S107). If a call related to a notifying service is not received, the method repeats step (S106).

If voice information V_Info is included in the call received from the mobile communication system 200, a notifying function included in the voice information V_Info is selected at step (S108), and the voice included in the voice information V_Info is played corresponding to the selected notifying function at step (S109).

In step (S107), if voice information V_Info is not included in the call received from the mobile communication system 200, a notifying function set by the terminal is selected and activated at step (S110), and a melody or other function, such as vibration, set by the terminal corresponding to the notifying function is activated at step (S111).

As described above, a voice notifying service system and a service providing method for a mobile terminal according to an exemplary embodiment of the present invention enables the reception of specific information at a time, and in a voice, desired by a terminal user according to a voice setting reserved by the terminal user.

Figure 7:
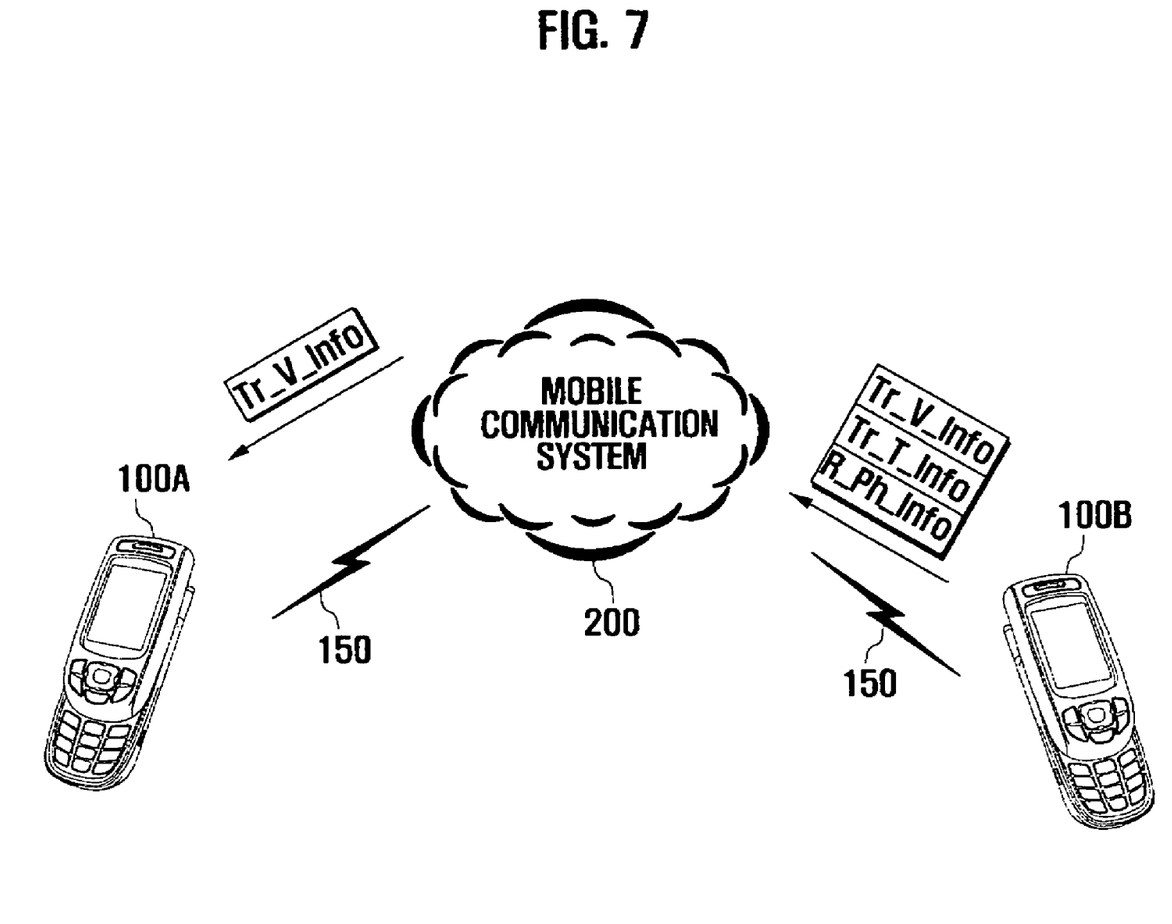
FIG. 7 is a schematic diagram showing a configuration of a voice notifying service system for a mobile terminal according to another exemplary embodiment of the present invention.

FIG. 7 is a schematic diagram showing a configuration of a voice notifying service system for a mobile terminal according to another exemplary embodiment of the present invention.

The configurations of a receiver's mobile terminal, caller's mobile terminal, and mobile communication system according to the exemplary embodiment of the present invention shown in FIG. 7 are substantially the same as those of the mobile terminal 100 and the mobile communication system 200 in the previously described exemplary embodiment. However, operating steps for call opening and storing are performed differently. Therefore, detailed explanations of the same element configurations are omitted, and the operating steps are described in greater detail below.

Referring to FIG. 7, the voice notifying service system comprises a receiver's (or receiving) mobile terminal 100A, a caller's (or calling) mobile terminal 100B, and the mobile communication system 200. If the caller's mobile terminal 100B generates voice information Tr_V_Info and transmits the voice information Tr_V_Info with time information Tr_T_Info and a receiver's telephone number R_Ph_Info designated by the caller's mobile terminal 100B to the mobile communication system 200, the mobile communication system 200 transmits the voice information Tr_V_Info to the receiver's mobile terminal 100A having the telephone number R_Ph_Info at the time specified in the time information Tr_T_Info.

For this, the mobile communication system 200 comprises the base station 202, base station controller 204, mobile switching center 206, billing unit 208, and voice service server 210, substantially as described above.

As described above, the voice service server 210 comprises the voice information database 212, time information database 214, telephone number database 216, and server control unit 218. The voice information database 212 stores the voice information Tr_V_Info generated and transmitted by the caller's mobile terminal 100B, and the time information database 214 stores the time information Tr_T_Info specifying the time for transmitting the voice information Tr_V_Info received from the caller's mobile terminal 100B.

The telephone number database 216 stores the telephone number R_Ph_Info of the receiver's mobile terminal 100A by which the voice information Tr_V_Info is to be received. The server control unit 218 controls storage of the voice information Tr_V_Info, time information Tr_T_Info, and receiver's telephone number R_Ph_Info transmitted by the caller's mobile terminal 100B in the corresponding databases, and controls transmission such that the voice information Tr_V_Info is transmitted to the receiver's mobile terminal 100A having the receiver's telephone number R_Ph_Info at the time specified in the time information Tr_T_Info.

The caller's mobile terminal 100B generates the voice information Tr_V_Info, sets the time information Tr_T_Info specifying the time for transmitting the generated voice information Tr_V_Info to the receiver's mobile terminal 100A, and stores the voice information Tr_V_Info in the voice service server 210 of the mobile communication system 200 by inputting the telephone number R_Ph_Info of the receiver's mobile terminal 100A. The voice information Tr_V_Info generated by the caller's mobile terminal 100B can include a voice desired for an alarm function or a morning call function, and a notifying voice desired for a schedule function.

The voice information Tr_V_Info can include a voice recorded directly by the caller and/or a voice partially or fully recorded during a telephone conversation with the receiver's mobile terminal 100A. The time information Tr_T_Info set by the caller's mobile terminal 100B can include daily repetition, repetition on a specific date, and/or repetition on a specific day of the week, in addition to the transmission time reservation for a specific date and time.

The receiver's mobile terminal 100A receives and plays the voice information Tr_V_Info transmitted by the voice service server 210 at the time specified in the time information Tr_T_Info. If a specific voice information is not registered in an alarm function or a morning call function, the receiver's mobile terminal 100A selects a predetermined terminal melody as a default. If voice information Tr_V_Info transmitted by the caller's mobile terminal 100B is received, the received voice information Tr_V_Info is played by the receiver's mobile terminal 100A. For this, a control unit of the receiver's mobile terminal 100A sets the voice information Tr_V_Info to a higher priority compared to the predetermined melody, and controls the voice information Tr_V_Info to be played by linking the voice information with a corresponding function specified in the voice information Tr_V_Info.

Figure 8A:
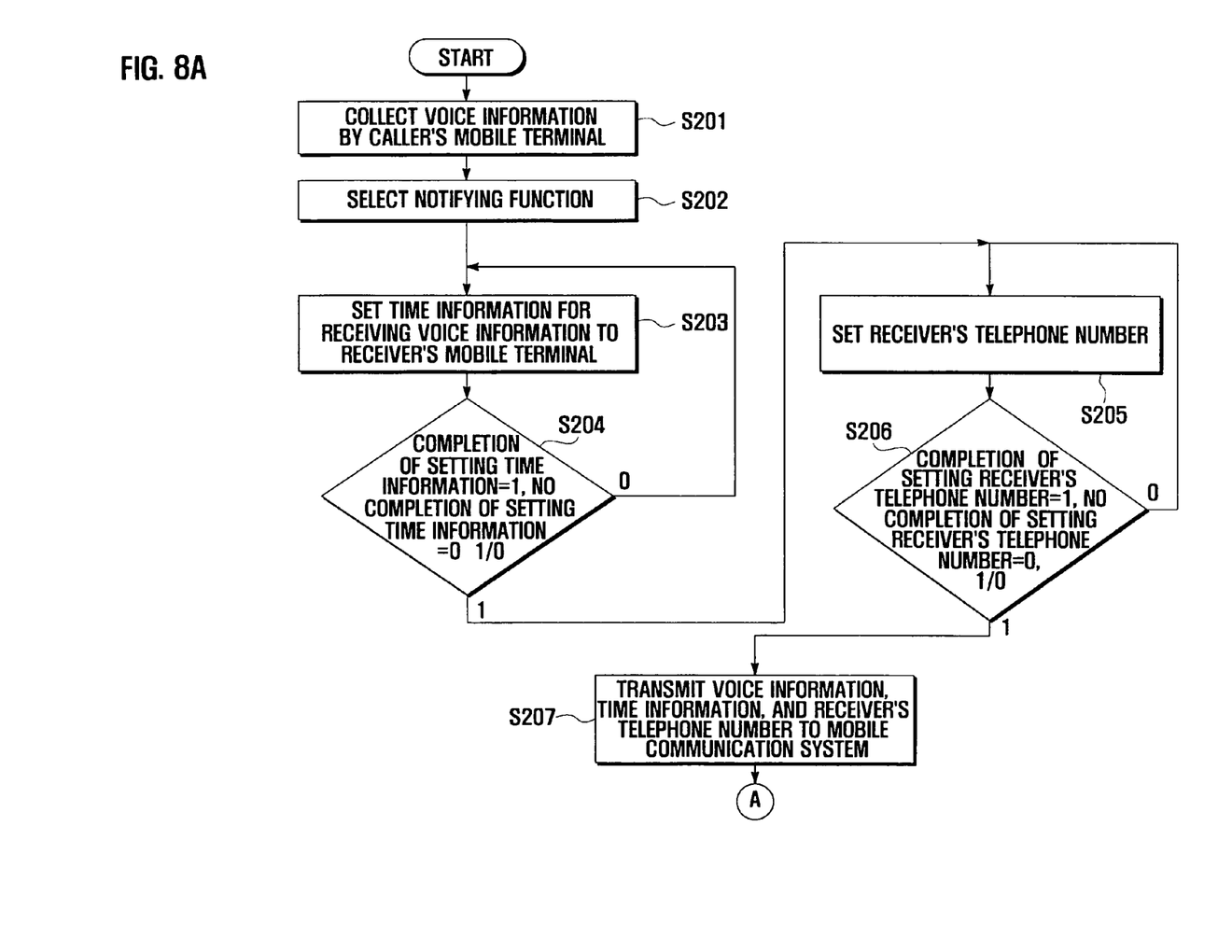
FIGS. 8A and 8B are flow charts showing a voice notifying service providing method for a mobile terminal according to another exemplary embodiment of the present invention.
Figure 8B:
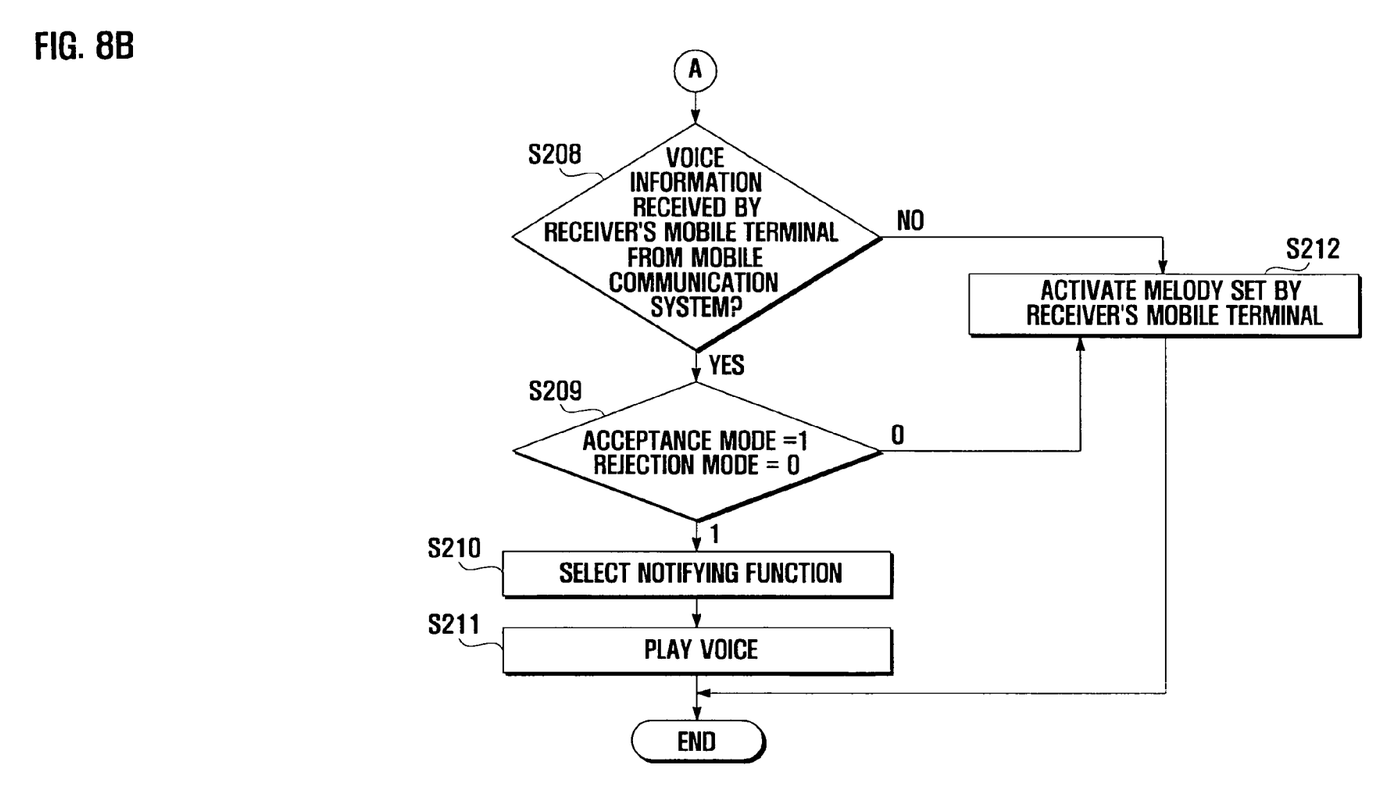
Figure 9:
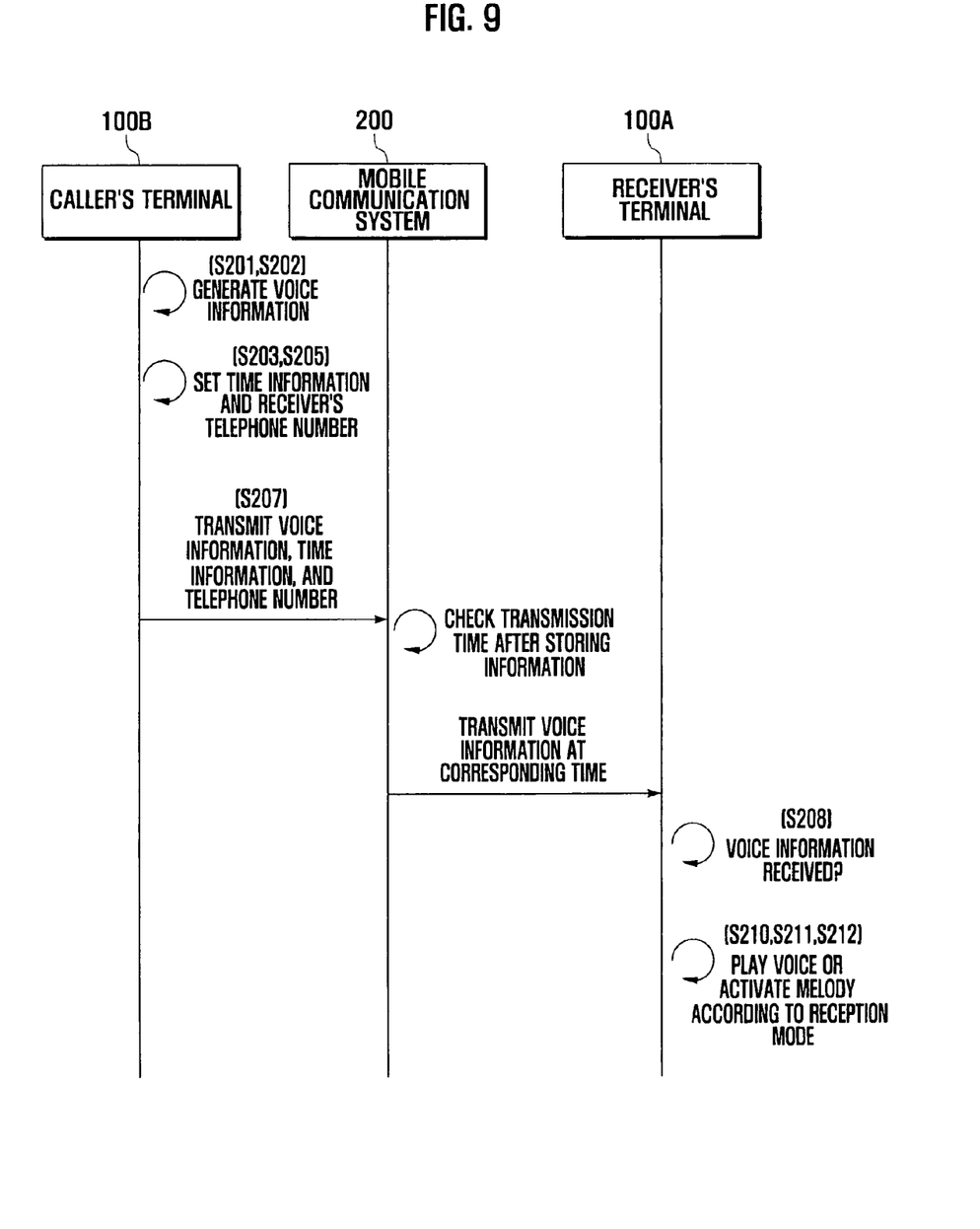
FIG. 9 is a flow chart showing signal exchanges in a voice notifying service system for a mobile terminal according to embodiments of the present invention shown in FIGS. 8A and 8B.

FIGS. 8A and 8B are flow charts showing a voice notifying service providing method for a mobile terminal according to another exemplary embodiment of the present invention. FIG. 9 is a flow chart showing signal exchanges in a voice notifying service system for a mobile terminal according to embodiments of the present invention shown in FIGS. 8A and 8B.

Referring to FIGS. 8A, 8B and 9, in the voice notifying service providing method, the caller's mobile terminal 100B first collects a voice to be used for the voice information Tr_V_Info at step (S201).

The voice included in the voice information Tr_V_Info can be recorded directly by the terminal user or another caller's voice can be recorded. The voice can be partially or fully stored according to the selection of the user during a voice communication with another terminal user for later use.

Subsequently, the caller's mobile terminal 100B selects a notifying function to be used for playing the voice included in the voice information Tr_V_Info at step (S202).

The voice included in the voice information Tr_V_Info can be linked with an alarm function, morning call function, schedule function, event notifying function, significant date notifying function, and/or due date notifying function.

The caller's mobile terminal 100B sets time information Tr_T_Info specifying the time for receiving the voice information Tr_V_Info by the receiver's mobile terminal 100A at step (S203).

When the setting of the time information is completed as detected at step (S204), the caller's mobile terminal 100B sets the telephone number of the receiver's mobile terminal 100A by which the voice information Tr_V_Info is to be received at step (S205). When the setting of the time information is not completed, the system returns to step (S203).

When the setting of the receiver's telephone number is completed as detected at step (S206), the voice information Tr_V_Info, time information Tr_T_Info, and receiver's telephone number R_Ph_Info are transmitted to the mobile communication system 200 at step (S207). When the setting of the receiver's telephone number is not completed, the system returns to step (S205).

In step (S207), the mobile communication system 200 stores the voice information Tr_V_Info, the time information Tr_T_Info, and the receiver's telephone number R_Ph_Info in the voice service server 210. The voice service server 210 stores the voice information V_Info, the time information T_Info, and the telephone number in the voice information database 212, the time information database 214, and the telephone number database 216, respectively. The voice service server 210 compares the time specified in the time information Tr_T_Info with the current time, and transmits the voice information Tr_V_Info to the receiver's mobile terminal 100A at the time specified in the time information Tr_T_Info.

The receiver's mobile terminal 100A identifies whether voice information Tr_V_Info is received from the mobile communication system at step (S208). If voice information Tr_V_Info is received, the receiver's mobile terminal 100A identifies whether the receiver's mobile terminal 100A is in an acceptance mode or in a rejection mode at step (S209). If voice information Tr_V_Info is not received by the receiver's mobile terminal 100A at a predetermined notifying service time, a melody preset by the receiver's mobile terminal 100A is activated at step (S212).

In step (S209), the receiver's mobile terminal 100A can selectively accept or reject the reception of the voice notifying service provided by the caller's mobile terminal 100B. That is, the receiver's mobile terminal 100A preferably receives the voice information Tr_V_Info transmitted by the caller's mobile terminal 100B only when the receiver's mobile terminal 100A has selected the acceptance mode for a voice notifying service provided by the caller's mobile terminal 10B. If the rejection mode is selected, the receiver's mobile terminal 100A may not receive the voice information Tr_V_Info transmitted by the caller's mobile terminal 100B.

If the receiver's mobile terminal 100A is in an acceptance mode, a notifying function included in the voice information Tr_V_Info is selected and activated at step (S210), and a voice included in the voice information Tr_V_Info is played corresponding to the notifying function at step (S211). If the receiver's mobile terminal 100A is in a rejection mode, a melody preset by the receiver's mobile terminal 100A is activated at step (S212).

As described above, the voice notifying service system and the service providing method for a mobile terminal according to exemplary embodiments of the present invention enable a caller's mobile terminal to transmit specific information to a receiver's mobile terminal at a time, and in a voice, desired by the caller according to a voice setting reserved by the caller.

According to the voice notifying service system and the service providing method for a mobile terminal disclosed in embodiments of the present invention, voice information to be received at the time designated by the terminal user is stored in a mobile communication system, and thereby the terminal user can obtain specific information in a voice desired by the terminal user when an alarm is activated.

Additionally, the voice notifying service system and the service providing method for a mobile terminal according to exemplary embodiments of the present invention enable a mobile terminal user to obtain specific information easily at the time and in a voice desired by the user, and thereby user satisfaction can be improved.

Additionally, the voice notifying service system and the service providing method for a mobile terminal according to exemplary embodiments of the present invention enable a caller's mobile terminal to generate and transmit voice information to a receiver's mobile terminal at a time, and in a voice, desired by the caller by linking the voice generated by the caller's mobile terminal with a specific notifying function.

Although exemplary embodiments of the present invention have been described in detail hereinabove, it should be understood that many variations and modifications of the basic inventive concepts herein described, which may appear to those skilled in the art, will still fall within the spirit and scope of the exemplary embodiments of the present invention as defined in the appended claims and their equivalents.

What is claimed is:

1. A voice notifying service system for a mobile terminal, comprising:
    a mobile communication system; and
    a mobile terminal for forming a communication channel with the mobile communication system, transmitting voice information comprising at least one of a telephone number of the mobile terminal, a user's voice, a received voice, and a notifying function for playing a voice, to the mobile communication system, transmitting time information to the mobile communication system specifying a time at which the voice information is to be transmitted to the mobile terminal, and playing the voice information received from the mobile communication system at the time specified in the time information by linking the notifying function,
    wherein the mobile communication system is configured to store the voice information with the notifying function for playing the voice, the time information and the telephone number in respective databases and match the telephone number with the voice information and time information.

2. The voice notifying service system of claim 1, wherein the mobile communication system comprises:
    a base station for forming the communication channel with the mobile terminal;
    a base station controller for controlling the base station; and
    a voice service server for storing the voice information, the time information, and a telephone number of the mobile terminal received from the base station controller, and for transmitting the voice information to the mobile terminal having the telephone number at the time specified in the time information.

3. The voice notifying service system of claim 2, wherein the voice service server comprises:
    a voice information database for storing at least one voice information transmitted by the mobile terminal;
    a time information database for storing the time information;
    a telephone number database for storing the telephone number of the mobile terminal; and
    a server control unit for controlling the voice information database, the time information database, and the telephone number database, and for controlling the voice service server to transmit the voice information to the mobile terminal having the telephone number at the time specified in the time information.

4. The voice notifying service system of claim 1, wherein the voice information comprises at least one of:
    a voice to be played when an alarm function is activated;
    a voice to be played when a morning call function is activated;
    a voice to be played according to a schedule function;
    a voice to be played when an event notifying function is activated;
    a voice to be played when a significant date notifying function is activated; and
    a voice to be played when a due date notifying function is activated.

5. The voice notifying service system of claim 1, wherein the mobile terminal comprises:
    a radio frequency unit for forming the communication channel;
    an audio processing unit for generating the voice;
    a memory unit for storing the voice information;
    a key input unit for generating an input signal for setting at least one of the voice information and the time information;
    a display unit for providing a screen interface for setting at least one of the voice information and the time information; and
    a control unit for controlling signal exchanges between the radio frequency unit, audio processing unit, memory unit, key input unit, and display unit, and for controlling the transmission of the voice and time information, and the reception of the voice information.

6. A voice notifying service providing method for a mobile terminal, comprising:
    generating voice information, comprising at least one of a telephone number of the mobile terminal, a user's voice, a received voice, and a notifying function for playing a voice;
    setting time information for transmitting the voice information to a mobile terminal;
    transmitting the voice information and the time information to a mobile communication system;
    identifying whether the voice information is received by the mobile terminal at the time specified in the time information; and
    playing the voice by linking the notifying function included in the voice information with the voice if the voice information is received,
    wherein the mobile communication system is configured to store the voice information with the notifying function for playing the voice, the time information and the telephone number in respective databases and match the telephone number with the voice information and time information.

7. The voice notifying service providing method of claim 6, wherein:

the notifying function comprises at least one of an alarm function, morning call function, schedule function, event notifying function, significant date notifying function, and due date notifying function.

8. The voice notifying service providing method of claim 6, further comprising:
   storing the voice information, the time information, and a telephone number of the mobile terminal in a database by the mobile communication system, after transmitting the voice and time information to the mobile communication system;
   comparing the time included in the stored time information with the current time by the mobile communication system; and
   transmitting the voice information to the mobile terminal having the telephone number by the mobile communication system if the time included in the stored time information is the same as the current time.

9. The voice notifying service providing method of claim 8, wherein transmitting the voice information to the mobile terminal by the mobile communication system comprises:
   extracting the telephone number matched to the time information;
   extracting the voice information matched to the extracted telephone number; and
   transmitting the extracted voice information to the mobile terminal having the telephone number.

10. The voice notifying service providing method of claim 8, further comprising identifying whether voice information to be transmitted to the mobile terminal is stored in the mobile communication system if the time included in the stored time information is the same as the current time.

11. The voice notifying service providing method of claim 10, further comprising notifying the mobile terminal and activating a predetermined melody provided by the mobile terminal if voice information to be transmitted to the mobile terminal is not stored in the mobile communication system.

12. A voice notifying service system for a mobile terminal, comprising:
   a calling mobile terminal for transmitting voice information, time information set for transmitting the voice information, and a telephone number of a mobile terminal by which the voice information is to be received, wherein the voice information is generated by linking a voice with a notifying function provided by the calling mobile terminal;
   a receiving mobile terminal for receiving the voice information at the time specified in the time information and playing the voice information; and
   a mobile communication system for receiving from the calling mobile terminal the voice information, the time information, and the telephone number, and for transmitting the voice information to the receiving mobile terminal at the time specified in the time information,
   wherein the mobile communication system is configured to store the voice information with the notifying function for playing the voice, the time information and the telephone number in respective databases and match the telephone number with the voice information and time information.

13. The voice notifying service system of claim 12, wherein:
   the receiving mobile terminal is configured to activate, if a notifying function is activated, a melody provided by the receiving mobile terminal; and
   if voice information corresponding to the notifying function is received, the receiving mobile terminal is configured to deactivate the melody and play the received voice information.

14. The voice notifying service system of claim 12, wherein the receiving mobile terminal is configured to operate in at least one of an acceptance mode for accepting a notifying function transmitted by the caller's mobile terminal and a rejection mode for rejecting the notifying function.

15. The voice notifying service system of claim 12, wherein the mobile communication system comprises a voice service server comprising:
   a voice information database for storing the voice information;
   a time information database for storing the time information;
   a telephone number database for storing the telephone number; and
   a server control unit for controlling storage of the voice information, the time information, and the receiving mobile terminal's telephone number, and for controlling the transmission of the voice information.

16. The voice notifying service system of claim 12, wherein the notifying function comprises at least one of an alarm function, morning call function, schedule function, event notifying function, significant date notifying function, and due date notifying function.

17. A voice notifying service providing method for a mobile terminal, comprising:
   generating voice information by a calling mobile terminal by linking a voice with a notifying function provided by the calling mobile terminal;
   setting time information for a time at which a receiving mobile terminal is to receive the voice information, and setting a telephone number of the receiving mobile terminal, by the calling mobile terminal;
   transmitting the voice information, the time information, and the telephone number of the receiving mobile terminal to a mobile communication system by the calling mobile terminal;
   identifying whether the voice information is received from the mobile communication system by the receiving mobile terminal; and
   playing, if the voice information is received, the voice by linking a notifying function with the voice by the receiving mobile terminal,
   wherein the mobile communication system is configured to store the voice information with the notifying function for playing the voice, the time information and the telephone number in respective databases and match the telephone number with the voice information and time information.

18. The voice notifying service providing method of claim 17, wherein the notifying function comprises at least one of an alarm function, morning call function, schedule function, event notifying function, significant date notifying function, and due date notifying function.

19. The voice notifying service providing method of claim 17, further comprising setting the receiving mobile terminal to an acceptance mode for accepting the notifying function or a rejection mode for rejecting the notifying function.

20. The voice notifying service providing method of claim 19, wherein, if the rejection mode is set, the receiving mobile terminal is configured to activate, at the time set by the notifying function, a melody predetermined by the receiving mobile terminal.

* * * * *